US011622055B2

(12) United States Patent
Tamaki

(10) Patent No.: US 11,622,055 B2
(45) Date of Patent: Apr. 4, 2023

(54) SHEET SEPARATING DEVICE AND IMAGE FORMING APPARATUS INCORPORATING THE SHEET SEPARATING DEVICE

(71) Applicant: Sachika Tamaki, Kanagawa (JP)

(72) Inventor: Sachika Tamaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/532,151

(22) Filed: Nov. 22, 2021

(65) Prior Publication Data

US 2022/0166895 A1 May 26, 2022

(30) Foreign Application Priority Data

Nov. 25, 2020 (JP) .............................. JP2020-195492

(51) Int. Cl.
*H04N 1/00* (2006.01)
(52) U.S. Cl.
CPC ....... *H04N 1/00628* (2013.01); *H04N 1/0057* (2013.01); *H04N 1/00631* (2013.01); *H04N 1/00644* (2013.01); *H04N 1/00663* (2013.01)
(58) Field of Classification Search
CPC ........ B65H 3/48; B65H 1/04; B65H 2220/01; B65H 2220/04; B65H 2402/10; B65H 2405/1142; B65H 2405/15; B65H 2405/332; B65H 2406/3662; B65H 2406/41; B65H 2511/12; B65H 2511/20; B65H 2801/06; B65H 3/0692; B65H 3/124; B65H 3/128; B65H 3/14; B65H 3/64; B65H 3/68; G03G 15/6511
USPC ....................................................... 358/498
See application file for complete search history.

(56) References Cited

U.S. PATENT DOCUMENTS

| 5,624,525 | A | * | 4/1997 | Ehara | ...................... B32B 39/00 156/542 |
| 7,828,235 | B2 | * | 11/2010 | Matlin | ................ B02C 18/2283 241/34 |
| 8,882,099 | B2 | * | 11/2014 | Lewalski | ............. B65H 29/246 270/52.09 |
| 11,390,475 | B2 | * | 7/2022 | Waragai | ................... B65H 3/48 |
| 2010/0096794 | A1 | * | 4/2010 | Watanabe | .............. B65H 31/02 271/3.14 |

(Continued)

FOREIGN PATENT DOCUMENTS

| JP | 2019-172449 | 10/2019 |
| JP | 2020-152523 | 9/2020 |

*Primary Examiner* — Negussie Worku
(74) *Attorney, Agent, or Firm* — Harness, Dickey & Pierce P.L.C.

(57) ABSTRACT

A sheet separating device includes a stacker, a pickup member, an air supplier, and a sheet floating restraint. The stacker is configured to stack a plurality of sheets. The pickup member is configured to convey the plurality of sheets one by one from the stacker. The air supplier includes an air outlet, at a downstream side of the stacker in a sheet conveyance direction. The air supplier is configured to blow air toward a downstream end of the plurality of sheets in the sheet conveyance direction. The sheet floating restraint is configured to restrict floating of a part of the plurality of sheets separated by air blown from the air outlet. The sheet floating restraint is replaceable with another sheet floating restraint. The sheet floating restraint and said another sheet floating restraint have respective shapes different from each other.

16 Claims, 10 Drawing Sheets

(56) References Cited

U.S. PATENT DOCUMENTS

| | | | |
|---|---|---|---|
| 2012/0133092 A1* | 5/2012 | Fuda | B65H 3/14 |
| | | | 271/104 |
| 2012/0161384 A1* | 6/2012 | Suzuki | B65H 3/68 |
| | | | 271/11 |
| 2018/0237239 A1* | 8/2018 | Okutsu | B65H 3/48 |
| 2020/0017325 A1* | 1/2020 | Kishimoto | B65H 9/101 |
| 2020/0122491 A1* | 4/2020 | Ogawa | B41J 11/0045 |
| 2020/0156894 A1* | 5/2020 | Tsuchiya | B65H 31/10 |
| 2020/0156896 A1* | 5/2020 | Tsuchiya | B65H 31/10 |
| 2020/0299081 A1* | 9/2020 | Waragai | B65H 3/48 |
| 2020/0299093 A1* | 9/2020 | Tamura | B65H 29/246 |
| 2022/0166895 A1* | 5/2022 | Tamaki | H04N 1/00663 |

\* cited by examiner

SHEET SEPARATING DEVICE AND IMAGE FORMING APPARATUS INCORPORATING THE SHEET SEPARATING DEVICE

CROSS-REFERENCE TO RELATED APPLICATIONS

This patent application is based on and claims priority pursuant to 35 U.S.C. § 119(a) to Japanese Patent Application No. 2020-195492, filed on Nov. 25, 2020, in the Japan Patent Office, the entire disclosure of which is hereby incorporated by reference herein.

BACKGROUND

Technical Field

Embodiments of the present disclosure relate to a sheet separating device and an image forming apparatus incorporating the sheet separating device.

Background Art

Known sheet separating devices include a sheet stacking table on which multiple sheet members are stackable and a pickup member that picks up the sheets on the sheet stacking table and feeds the sheets one by one from the sheet stacking table.

For example, a known sheet separating device includes an air supplier that supplies air from an air blowing port or air outlet provided on the front side of the sheet stacking table in the sheet conveyance direction in which the sheet member is fed and conveyed from the sheet stacking table, toward downstream in the sheet conveyance direction. The sheet separating device includes a sheet floating restraint that restricts a part of the sheet member separated from the rest of the sheets on the sheet stacking table by air blown from the air outlet, from floating.

SUMMARY

Embodiments of the present disclosure described herein provide a novel sheet separating device including a stacker, a pickup member, an air supplier, and a sheet floating restraint. The stacker is configured to stack a plurality of sheets. The pickup member is configured to convey the plurality of sheets one by one from the stacker. The air supplier includes an air outlet, at a downstream side of the stacker in a sheet conveyance direction in which a sheet is conveyed from the plurality of sheets on the stacker. The air supplier is configured to blow air toward a downstream end of the plurality of sheets in the sheet conveyance direction. The sheet floating restraint is configured to restrict floating of a part of the plurality of sheets separated by air blown from the air outlet. The sheet floating restraint is replaceable with another sheet floating restraint. The sheet floating restraint and said another sheet floating restraint have respective shapes different from each other.

Further, embodiments of the present disclosure described herein provide an image forming apparatus including the above-described sheet separating device and an image forming device configured to form an image on the sheet separated by the sheet separating device.

Further, embodiments of the present disclosure described herein provide a sheet separating device including a stacker, a pickup member, an air supplier, a sheet floating restraint, and an adjuster. The stacker is configured to stack a plurality of sheets. The pickup member is configured to convey the plurality of sheets one by one from the stacker. The air supplier includes an air outlet, at a downstream side of the stacker in a sheet conveyance direction in which a sheet is conveyed from the plurality of sheets on the stacker. The air supplier is configured to blow air toward a downstream end of the plurality of sheets in the sheet conveyance direction. The sheet floating restraint is configured to restrict floating of a part of the plurality of sheets separated by air blown from the air outlet. The adjuster is configured to change a shape or a posture of the sheet floating restraint, based on change information.

Further, embodiments of the present disclosure described herein provide an image forming apparatus including the above-described sheet separating device and an image forming device configured to form an image on the sheet separated by the sheet separating device.

BRIEF DESCRIPTION OF THE SEVERAL VIEWS OF THE DRAWINGS

Exemplary embodiments of this disclosure will be described in detail based on the following figures, wherein.

Figure 1:
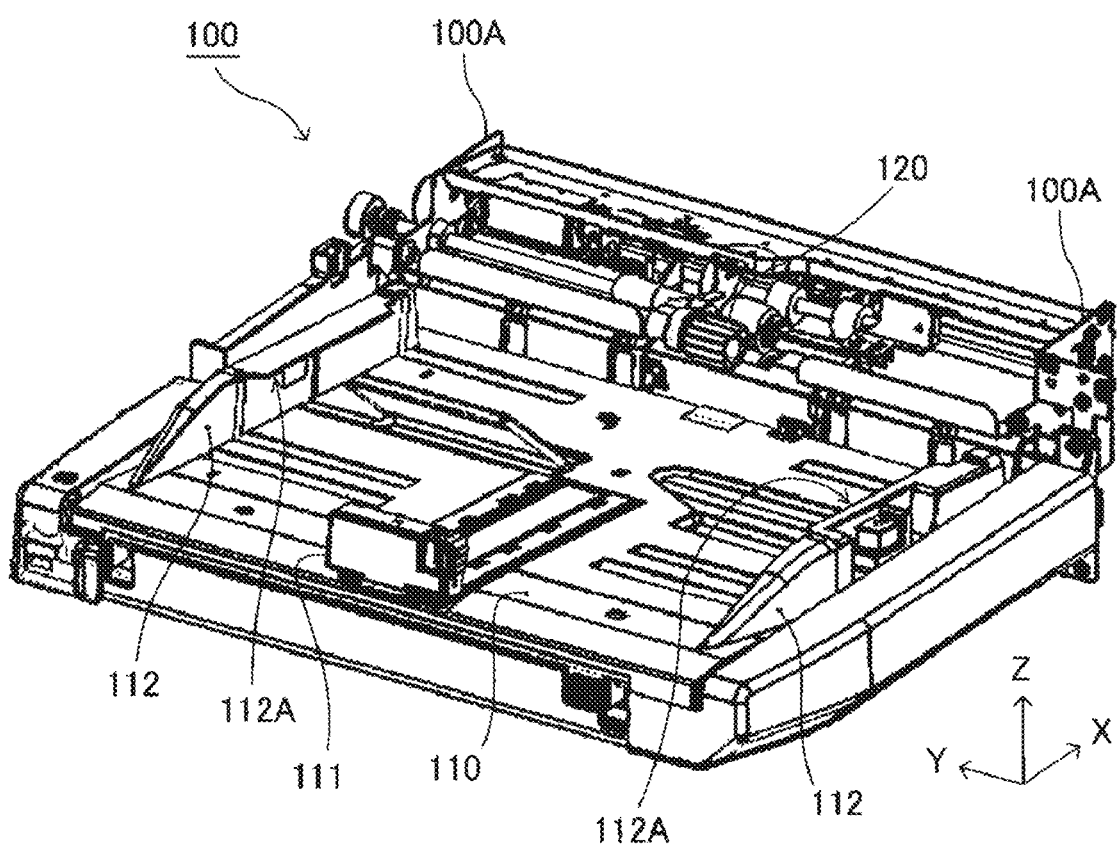
FIG. 1 is a perspective view of a sheet separating device according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will he understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given of a sheet separating device and an image forming apparatus according to an embodiment of the present disclosure, with reference to the following figures. Note that the embodiments are not limited to the illustrated examples and the specific examples described below.

First Embodiment

Specifically, a description is now given of a sheet separating device (or a sheet feeder) according to an embodiment (referred to as a "first embodiment") of the present disclosure, suitable for handling a recording medium used as a sheet material particularly in an image forming apparatus. The recording medium is herein after referred to as a recording sheet or simply as a sheet.

FIG. 1 is a perspective view of a sheet separating device 100 according to a first embodiment.

The sheet separating device 100 includes a sheet stacking table 110 and a pickup roller 120. The sheet stacking table 110 is a receptacle that holds a plurality of sheets S that functions as recording media. In other words, a plurality of sheets S is stackable on the sheet stacking table 110. The pickup roller 120 is a pickup rotator that feeds the plurality of sheets S one by one. The sheet separating device 100 feeds the plurality of sheets S from the sheet stacking table 110 one by one. Note that the sheet separating device 100 according to the first embodiment includes a configuration used for operations performed by the sheet separating device 100, included in an image forming apparatus to which the sheet separating device 100 is applied. A description of the image forming apparatus is given below.

An end fence 111 is disposed on the sheet stacking table 110 and regulates the trailing end of the sheet S in a direction in which the sheet S is fed or conveyed. Note that the direction in which the sheet S is fed or conveyed is hereinafter referred to as a sheet conveyance direction. Note that the trailing end of the sheets S indicates an upstream side of the sheets S in the sheet conveyance direction. A side fence pair 112 is disposed on the sheet stacking table 110 and regulates both lateral ends of the sheet S. The lateral ends of the sheet S correspond to the ends in the width direction of the sheet S, which is a direction perpendicular to the sheet conveyance direction. The side fence pair 112 is provided with a side sheet floating restraint pair 112A. The side sheet floating restraint pair 112A is disposed on opposed widthwise end portions of the sheet separating device 100 perpendicular to the sheet conveyance direction to restrict floating of a part of the plurality of sheets S separated from each other. Each of the side sheet floating restraint pair 112A extends from an upper portion of each of the side fence pair 112 toward a widthwise center of the sheet separating device 100 by a given length.

Figure 2:
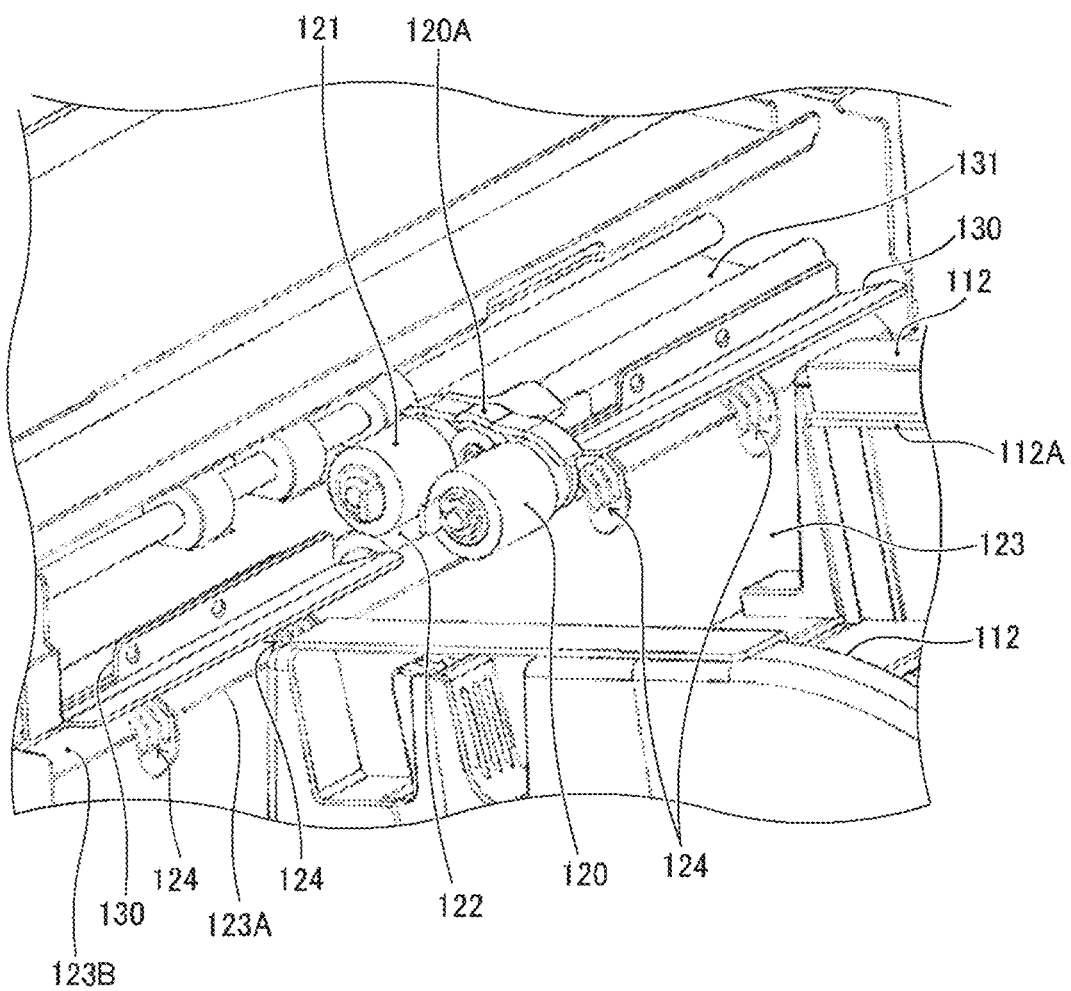
FIG. 2 is an enlarged perspective view of an area near a pickup roller included in the sheet separating device of FIG. 1.

FIG. 2 is an enlarged perspective view of the pickup roller 120 and surrounding components in the sheet separating device 100.

The pickup roller 120, a feed roller 121, and a reverse roller 122 construct a sheet separation-feed unit employing a feed and reverse roller (FRR) sheet feeding method. The feed roller 121 further conveys the fed sheet S. The reverse roller 122 contacts the feed roller 121 from below to rotate via a torque limiter in a direction in which the sheet S returns toward the pickup roller 120. The pickup roller 120 is supported by a swing arm 120A.

A front wall plate 123 that is a part of a front wall against which the leading end of the sheet S on the sheet stacking table 110 contacts is disposed opposite the pickup roller 120 in the width direction of the sheet separating device 100. Note that the leading end of the sheet S indicates a downstream side of the sheet S in the sheet conveyance direction. The front wall plate 123 is bent at two bent portions 123A from a vertically extending portion and extends downstream in the sheet conveyance direction. The front wall plate 123 includes a lower guide plate 123B as a portion thus extending downstream in the sheet conveyance direction. The upper portion of the reverse roller 122 projects from an opening formed in the lower guide plate 123B. A portion between the two bent portions 123A is inclined so as to become higher downstream in the sheet conveyance direction.

An air outlet 124 is opened in the lower guide plate 123B. Air from an air duct 125 is blown out through the air outlet 124. A front sheet floating restraint 130 functions as a floating regulator and is disposed on each outer side of the pickup roller 120 in the width direction of the sheet separating device 100. The front sheet floating restraint 130 is detachably attached to an upper guide plate 131, on each outer sides of the pickup roller 120 in the width direction of the sheet separating device 100. The upper guide plate 131 is fixed to a housing side plate pair 100A of the sheet separating device 100. The pickup roller 120 is interposed between the two pairs of air outlets 124 in the width direction of the sheet separating device 100. In other words, the four air outlets 124 are disposed as illustrated in FIG. 2. The front sheet floating restraints 130 are located above the air outlets 124.

Figure 3:
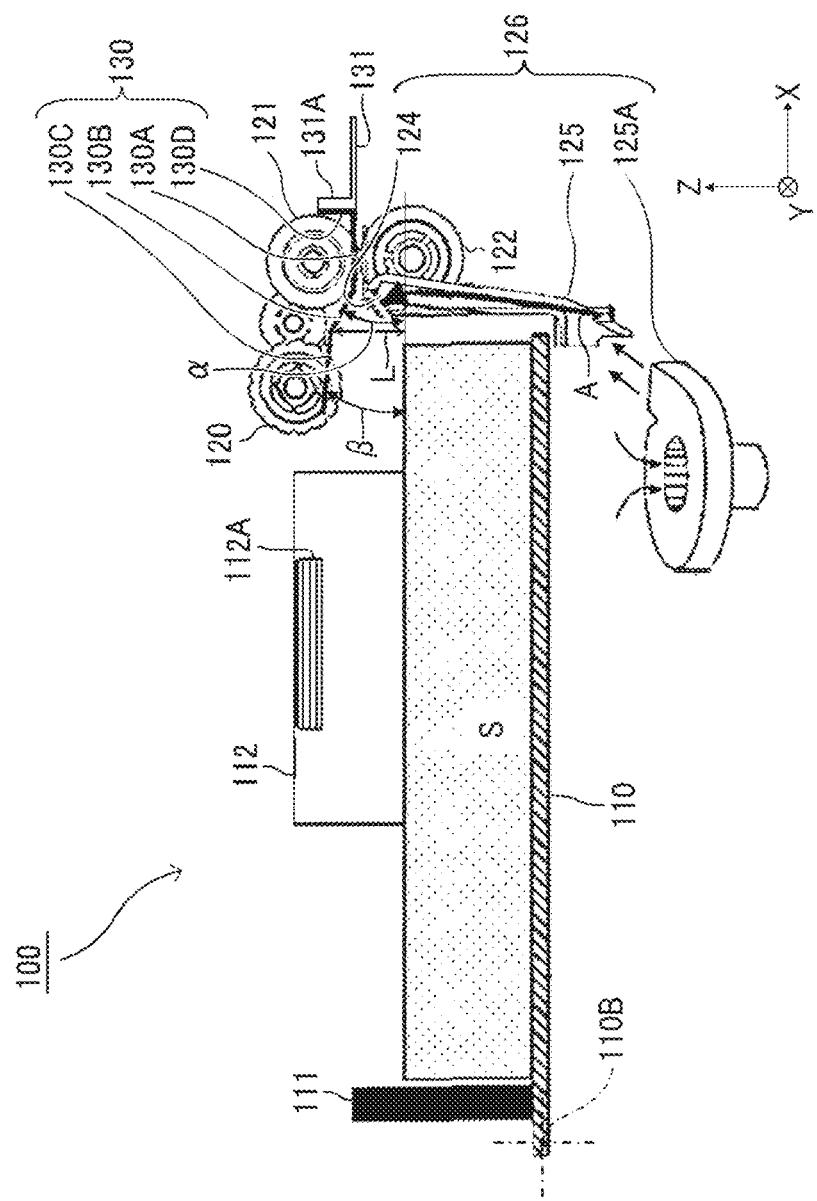
FIG. 3 is a schematic view of a portion of sheet separation and conveyance in the sheet separating device of FIG. 1.

FIG. 3 is a schematic view of main components of the sheet separating device 100 according to the first embodiment, for separating and feeding a sheet S.

As the sheet stacking table 110 rotates about a rotation fulcrum 110B or horizontally rises, a sheet S or an uppermost sheet S of a plurality of sheets S comes into contact with the pickup roller 120 and enters a feedable state. A fan 125A that functions as an air supply source supplies air to the air duct 125 that functions as an air chamber. The air supplied by the fan 125A hits the upper portion of the sheets S stacked on the sheet stacking table 110 via the air outlets 124 above the air duct 125. The fan 125A, the air duct 125, the air outlets 124 construct an air supplier 126. The air from the air outlets 124 may lift a part of the plurality of sheets S. In order to prevent the part of the plurality of sheets S from being blown off, the first embodiment provides the front sheet floating restraint 130 that functions as a floating regulator, in addition to the side sheet floating restraint pair 112A, to restrict floating of the plurality of sheets S.

The front sheet floating restraint 130 includes a support 130A, a first inclined portion 130B, and a second inclined portion 130C in this order from a downstream side in the sheet conveyance direction and is disposed extending along the upper guide plate 131, toward upstream in the sheet conveyance direction. Specifically, the support 130A of the front sheet floating restraint 130 includes a rising portion 130D that stands as illustrated in FIG. 3. Each of the first inclined portion 130B and the second inclined portion 130C is a sloped portion inclined away from the surface of the plurality of sheets S (sheet bundle) stacked on the sheet stacking table 110, toward upstream in the sheet conveyance direction. The rising portion 130D is detachably attached to a rising portion 131A via a fastening member such as a screw or screws. The rising portion 131A is formed at the downstream end of the upper guide plate 131 in the sheet conveyance direction.

The side sheet floating restraint pair 112A and the front sheet floating restraint 130 restrict the floating sheet from being blown off. The side sheet floating restraint pair 112A and the front sheet floating restraint 130 are, however, different from each other in whether the side sheet floating restraint pair 112A and the front sheet floating restraint 130 are parallel to a surface of a sheet S or have an angle $\alpha$ and an angle $\beta$ with respect to the surface of the sheet S. Specifically, the side sheet floating restraint pair 112A is parallel to the sheet S; whereas the front sheet floating restraint 130 forms the angle $\alpha$ and the angle $\beta$ with respect to an upper surface of the sheet S resting on the sheet stacking table 110 but not lifted by air. More specifically, a lower surface of the first inclined portion 130B, to which air is blown from the air outlets 124, forms the angle $\alpha$. The second inclined portion 130C that contacts an upper surface of a floating sheet S and restricts further floating of the sheet S forms the angle $\beta$.

Figure 4:
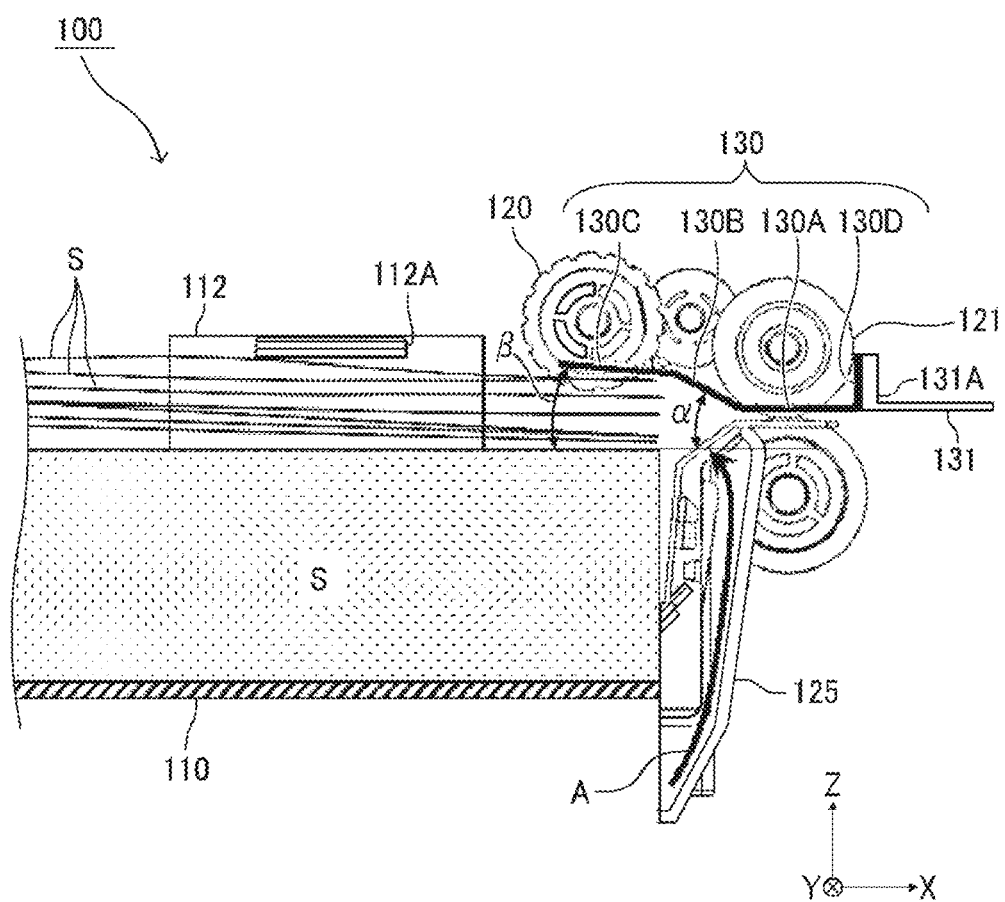
FIG. 4 is a diagram illustrating the sheet separating device of FIG. 1, in a state in which air is blown.

FIG. 4 is a diagram illustrating the sheet separating device 100, in a state in which air is blown toward the sheets S.

As described above, the front sheet floating restraint 130 restricts floating of sheets S. In addition, the front sheet floating restraint 130 receives air blown out from the air outlets 124 and changes the air blowing direction A (in other words, guides the air). With these effects, the front sheet floating restraint 130 sends the air substantially parallel to the sheets S. In other words, the front sheet floating restraint 130 corrects the air blowing direction A to a direction in which the sheets S are reliably separated from each other. That is, when separating the sheets S by air, it is likely to be further effective to blow air parallel to the sheets S to separate the sheets S from each other.

The angle $\alpha$ depends on, for example, a channel shape of the air duct 125, size and relative positions of the air outlets 124. However, the angle $\alpha$ is desirably an acute angle. An obtuse angle is inefficacious in restricting floating of the sheets S and correcting the air blowing direction A out from the air outlets 124.

In order to receive the air and change the air blowing direction A (to effectively guide the air), the front sheet floating restraint 130 is made of a material capable of guiding air. Specifically, the material and the structure of the front sheet floating restraint 130 do not allow the air to pass through the front sheet floating restraint 130 in a thickness direction of the front sheet floating restraint 130. In a case in which the front sheet floating restraint 130 simply restricts floating of sheets S, rather than changes the air blowing direction A to effectively guide the air, such material and structure may not be adopted. In such a case, a sheet S restricted from floating may function as an air guide that guides air entering between the sheet S and another sheet S below the sheet S. Even when the sheet S thus functions as an air guide, the inclination of the front sheet floating restraint 130 at the angle $\alpha$ is efficacious in regulating the posture of the sheets S.

As described above, the front sheet floating restraint 130 according to the first embodiment restricts floating of sheets S and receives air blown out from the an outlets 124 and changes the air blowing direction A to guide the air. By so doing, the separability and the feeding performance are obtained. However, the shape of the front sheet floating restraint 130 to stably obtain these effects depends on difference of sheets stacked on the sheet stacking table 110 or the remaining amount of sheets on the sheet stacking table 110. In a case in which the shape of the front sheet floating restraint 130 is not changeable, these effects are likely to fully work on a type of sheet but are less likely to work on another type of sheet sufficiently.

In order to address this inconvenience, in the first embodiment, the front sheet floating restraint 130 are removed from the sheet separating device 100 so as to be replaceable (changeable) to another front sheet floating restraint that has a different shape from the front sheet floating restraint 130. As described above, the front sheet floating restraint 130 is replaceable in the first embodiment, so that the front sheet floating restraint 130 included in the sheet separating device 100 according to the first embodiment restricts floating of sheets S and receives air blown out from the air outlets 124 and changes the air blowing direction A (to guide the air), on more variety of sheets. According to this configuration, the separability and the feeding performance are obtained stably.

Figure 5:
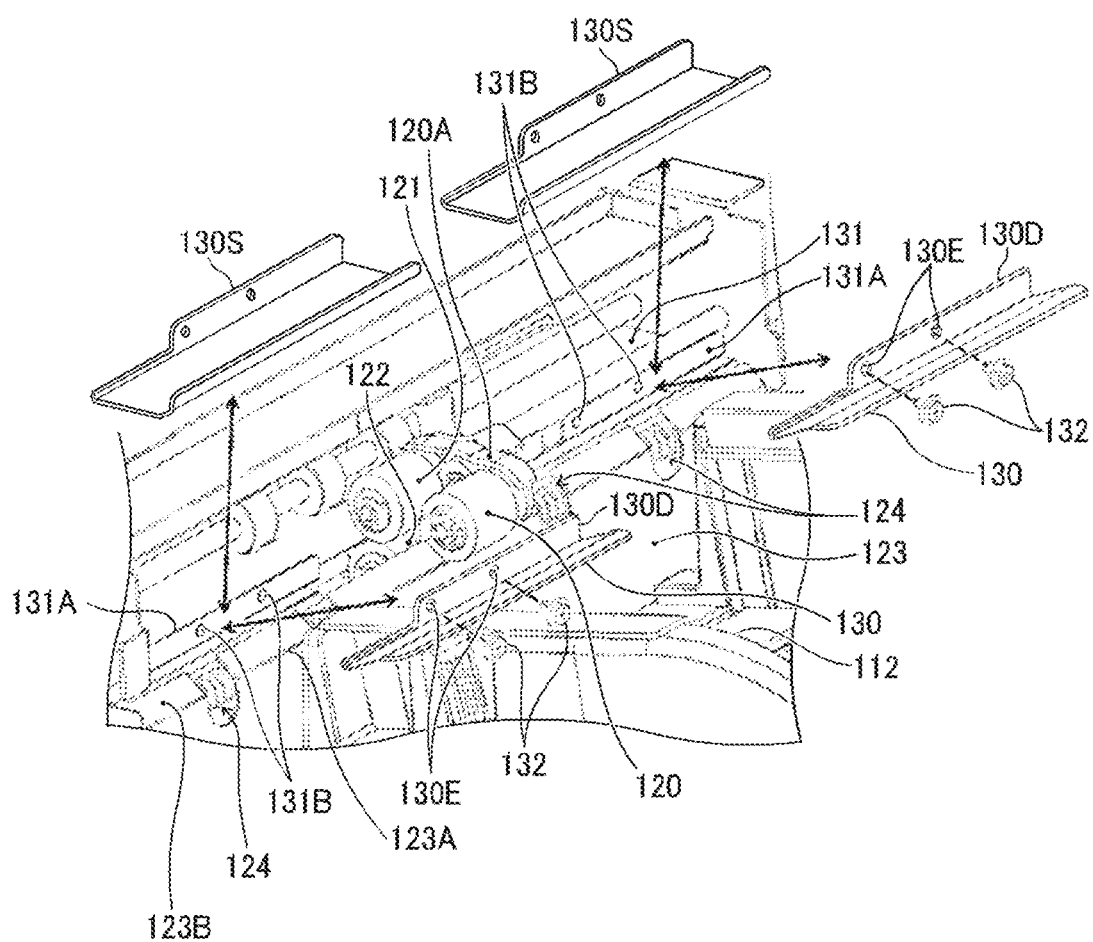
FIG. 5 is a diagram illustrating the sheet separating device of FIG. 1, when a front sheet floating restraint is replaced.

FIG. 5 is a diagram illustrating the sheet separating device of FIG. 1, when the front sheet floating restraint 130 is replaced.

In the first embodiment, two or more front sheet floating restraints, e.g., the front sheet floating restraint 130 and a front sheet floating restraint 130S, are prepared in advance. The front sheet floating restraint 130 and the front sheet floating restraint 130S have different shapes from each other. According to the type of sheets S stacked on the sheet stacking table 110, a suitable front sheet floating restraint is selected from the front sheet floating restraint 130 and the front sheet floating restraint 130S and attached to the upper guide plate 131. In attachment of a front sheet floating restraint in the first embodiment, respective screws 132 are inserted into corresponding through holes 130E formed in the rising portion 130D of the front sheet floating restraint 130, so as to fasten the screws 132 are fastened to corresponding screw holes 131B formed in the rising portion 131A of the upper guide plate 131. Accordingly, the front sheet floating restraint 130 is attached to the upper guide plate 131. To detach the front sheet floating restraint 130 from the upper guide plate 131, the screws 132 are unscrewed.

Note that the method of attaching and detaching the front sheet floating restraint 130 is not limited to the fastening by screw as in the first embodiment but another method may be adopted. For example, attachment by magnetic force (magnet), attachment by adhesive, attachment by, e.g., hook-and-loop fastener, or attachment by hook, inset, or snapfit shape may be adopted.

Figure 6A:
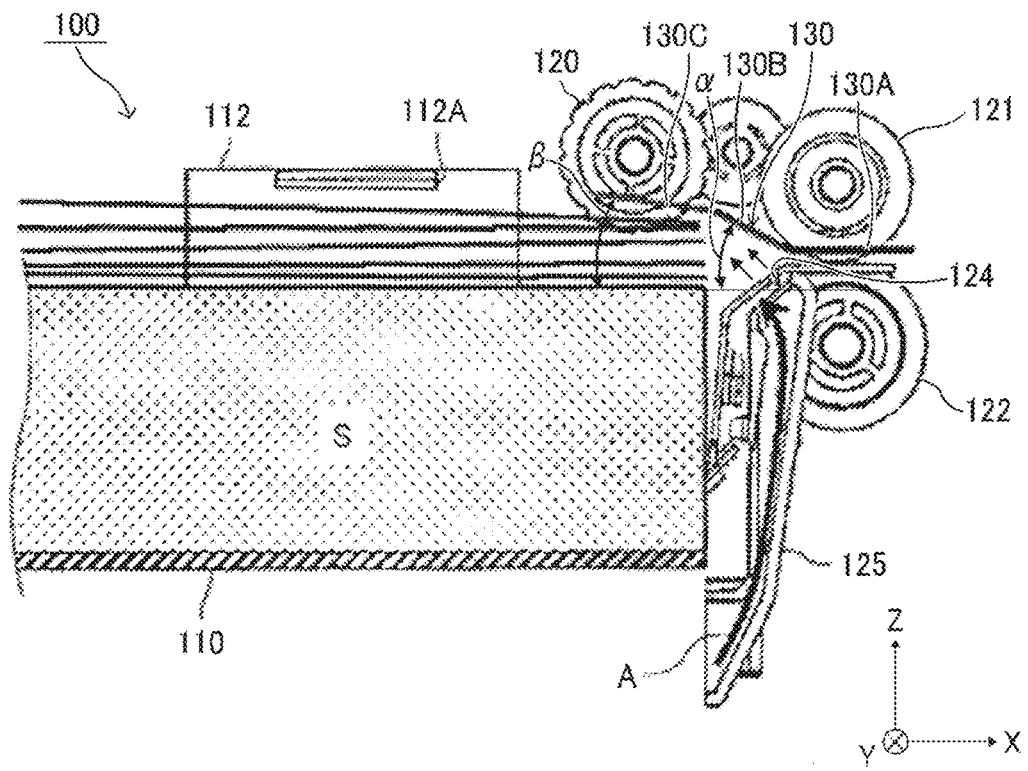
FIGS. 6A and 6B are diagrams, each illustrating a preferable shape of the front sheet floating restraint when various types of sheets are stacked together on a sheet stacking table.
Figure 6B:
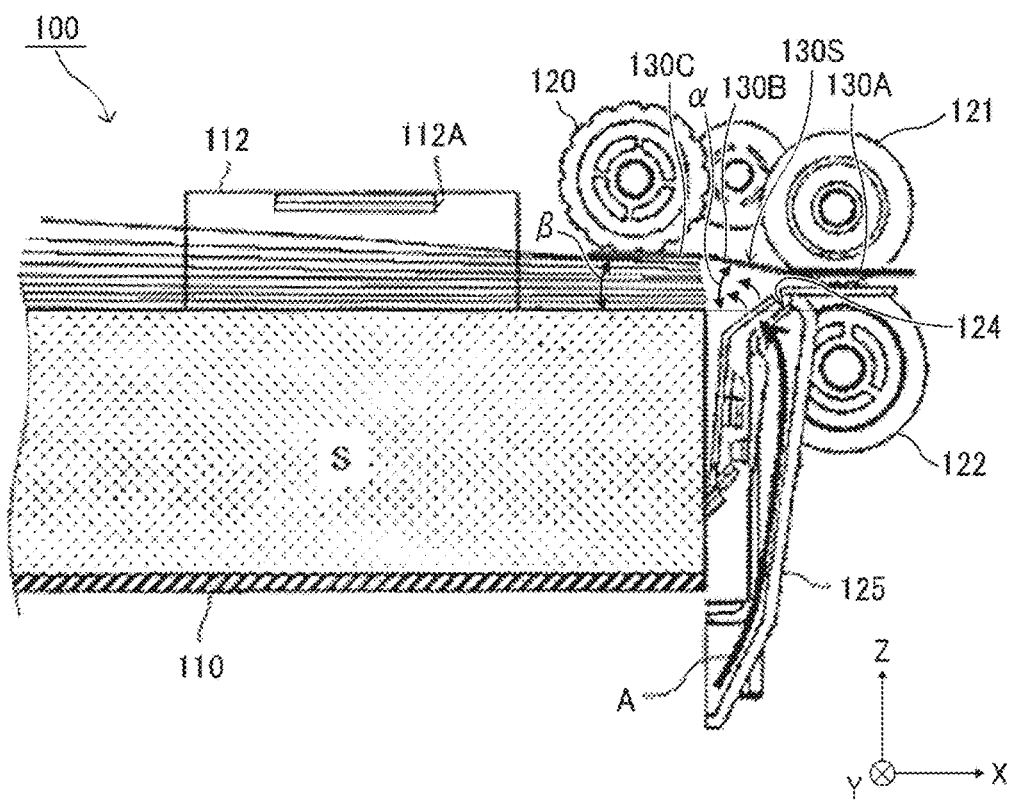

FIGS. 6A and 6B are diagrams each illustrating an example shape of the front sheet floating restraint 130 when various types of sheets are stacked together on the sheet stacking table 110.

In a case in which the sheet S is relatively high in mass (percent) per sheet and relatively high rigid (e.g., sheet material such as thick paper and coated paper), force in the upward direction acting on the sheet S is applied to float the sheet S. Based on this condition, as illustrated in FIG. 6A, the front sheet floating restraint 130 is to have a relatively large angle α of the first inclined portion 130B to which air is blown from the air outlets 124. With such a relatively large angle α, the air blowing direction A directs further upwardly, increasing the force in the upward direction acting on the sheet S to which the air is blown. This increase of the force stably floats the sheet S having a large mass (percent), and the sheets S are sufficiently separated.

As illustrated in FIG. 6A, when the angle α is relatively large, the distance L illustrated in FIG. 3 increases, in other words, the shortest distance between the second inclined portion 130C that contacts the floating sheet S and the upper surface of the sheet S resting on the sheet stacking table 110 but not lifted by air becomes longer. Due to such a configuration, even when the sheet S is relatively thick, a sufficient space for the sheet S to float is obtained, in other words, a space having a sufficient interval to intake air between the sheets S is obtained. According to this configuration, air stably passes through between the sheets S having a certain thickness, and the sheets S are sufficiently separated. In order to enhance the effect of the separability, the angle β of the second inclined portion 130C may also be relatively large.

On the other hand, in a case in which the sheet S is relatively low in mass (percent) per sheet and less rigid (e.g., sheet material such as thin paper and coated paper), it is likely that the sheet S excessively floats up to cause a paper jam. As described above, the side fence pair 112 according to the first embodiment is provided with the side sheet floating restraint pair 112A to restrict floating of both ends of the sheet S in the width direction. However, in a case in which the sheet S is less rigid and the upward force acting on the sheet S by air is too large, the sheet S may climb over the side sheet floating restraint pair 112A. In this case, the sheet S floats up more than initially envisioned, which may cause a paper jam.

In order to address this inconvenience, when the sheet S is a sheet material that is relatively low in mass (percent) per sheet and less rigid, since the angle α of the first inclined portion 130B to which air from the air outlets 124 is blown is smaller in the front sheet floating restraint 130S as illustrated in FIG. 6B, the front sheet floating restraint 130S having the smaller angle α is more suitable than the front sheet floating restraint 130. With the smaller angle α, the air is blown in a substantially horizontal direction, and the upward component is reduced. As a result, the upward force acting on the sheet S to which this air is blown is reduced, an excessive floating of the sheet S is restricted, and paper jam is prevented.

When the angle α is relatively small as illustrated in FIG. 6B, the distance L illustrated in FIG. 3 decreases, in other words, the shortest distance between the second inclined portion 130C that contacts the floating sheet S and the upper surface of the sheet S resting on the sheet stacking table 110 but not lifted by air becomes shorter. According to this configuration, the sheet S such as a thin paper is provided with a sufficient space to float up and the excessive floating of the sheet S is restricted, thereby restraining occurrence of a paper jam. In order to enhance the effect of restricting floating the sheets, the angle β of the second inclined portion 130C may also be relatively small. Further, the length of the second inclined portion 130C in the sheet conveyance direction is increased, so that the second inclined portion 130C comes to contact the surface of the sheet S to obtain a wider area for restricting movement of the sheet S. This configuration may also be efficacious in enhancing the restriction of floating of the sheet S.

Figure 7A:
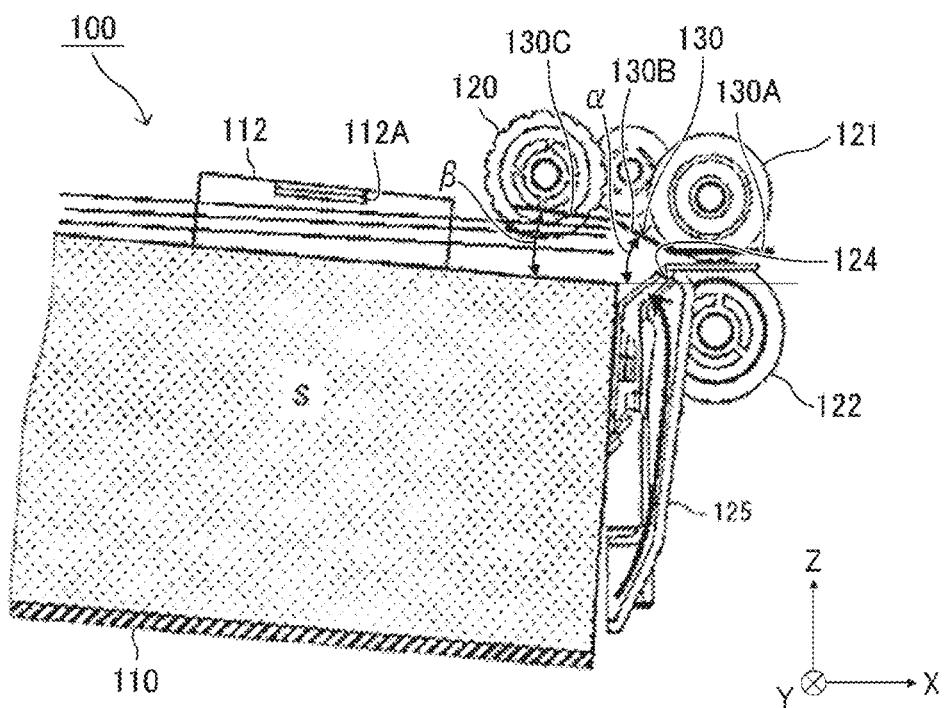
FIGS. 7A and 7B are diagrams, each illustrating a preferable shape of the front sheet floating restraint when the remaining amounts of sheets on the sheet stacking table are different.
Figure 7B:
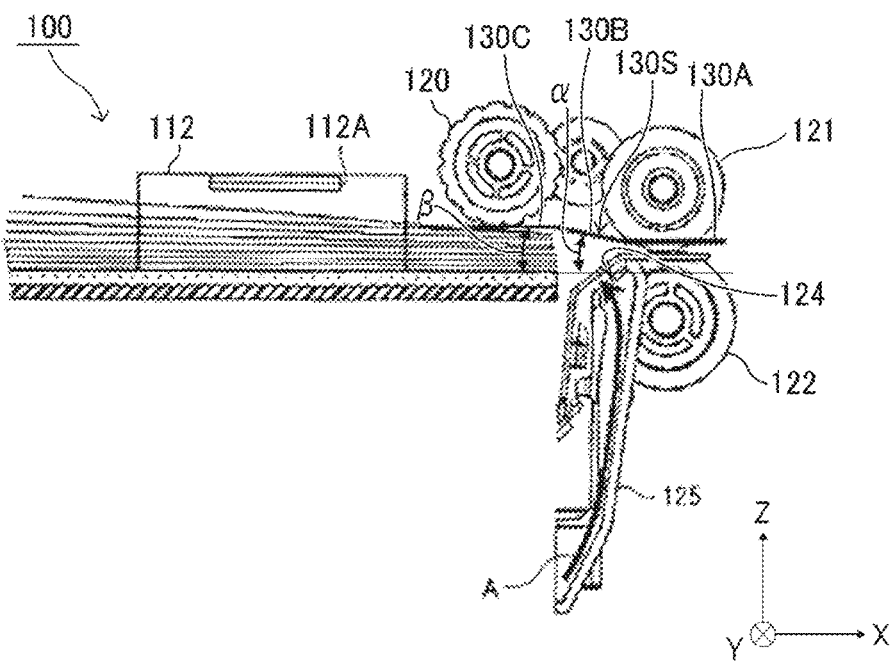

FIGS. 7A and 7B are diagrams, each illustrating a preferable shape of the front sheet floating restraint 130 when the remaining amounts of sheets on the sheet stacking table 110 are different from each other.

In the sheet separating device 100 according to the first embodiment, the sheet stacking table 110 rotates about the rotation fulcrum 110B near the trailing end of the sheets S, so that the leading end of the sheets S on the sheet stacking table 110 is moved in the vertical direction (upward and downward directions). The leading end of the sheets S on the sheet stacking table 110 is biased upwardly by a biasing member such as a spring. Even when the remaining amount of sheets changes, the height of the upper face at the leading end of the sheets S on the sheet stacking table 110 is substantially constant, as illustrated in FIGS. 7A and 7B. However, the angle and posture of the upper face at the leading end of the sheets resting on the sheet stacking table 110 but not lifted by air change depending on the remaining amount of sheets on the sheet stacking table 110.

When the angle or posture of the upper face of the leading end of the sheets S stacked on the sheet stacking table 110 changes, the correlation of air guided by the front sheet floating restraint 130 and the leading end of the sheets S to which the air is blown changes. Due to this configuration, air that is blown to the sheets S may not be blown to the leading end of the sheets S at an appropriate angle depending on the remaining amount of sheets S, and the sheets are not likely to be sufficiently separated. Since the appropriate shape of the front sheet floating restraint 130 varies according to the remaining amount of sheets, it is effective to replace the front sheet floating restraint according to the remaining amount of sheets.

Specifically, as illustrated in FIG. 7A, when the upper face of the leading end of the sheets S on the sheet stacking table 110 directs further downward toward the leading end of the sheets S due to the large remaining amount of sheets S, the air blowing direction toward the leading end of the sheets S is brought to direct further upward, so that air is blown to the leading end of the sheets S at an optimal angle. In this case, as illustrated in FIG. 7A, the front sheet floating restraint 130 preferably has a shape having a relatively large angle α of the first inclined portion 130B to which air is blown from the air outlets 124.

On the other hand, as illustrated in FIG. 7B, when the upper face of the leading end of the sheets S on the sheet stacking table 110 is substantially horizontal due to the small remaining amount of sheets S, the air blowing direction A toward the leading end of the sheets S is brought to be close to the horizontal direction, so that air is blown to the leading end of the sheets S at an optimal angle that is close to an angle illustrated in FIG. 7A. In this case, as illustrated in FIG. 7B, the front sheet floating restraint 130 preferably has a shape having a relatively small angle α of the first inclined portion 130E to which air is blown from the air outlets 124.

As in the first embodiment, an appropriate shape is selected between the front sheet floating restraint 130 and the front sheet floating restraint 130S, according to the type of sheets S or the remaining amount of sheets S in replacement of the front sheet floating restraint. In a case in which such an appropriate shape is selected by a user alone for replacing the front sheet floating restraint, the selection is likely to be correct. In order to avoid such an error in the selection, the sheet separating device 100 according to the first embodiment specifies a suitable shape between the front sheet floating restraint 130 and the front sheet floating restraint 130S, according to the type of the sheets S or the remaining amount of sheets S and makes a notification to prompt a user to replace (change) the currently-attached front sheet floating restraint to the specified one selected between the front sheet floating restraint 130 and the front sheet floating restraint 130S. As a result, the user can replace (change) the front sheet floating restraint 130 or the front sheet floating restraint 130S with an optimal front sheet floating restraint, following the notification without making an error in the selection.

Figure 8:
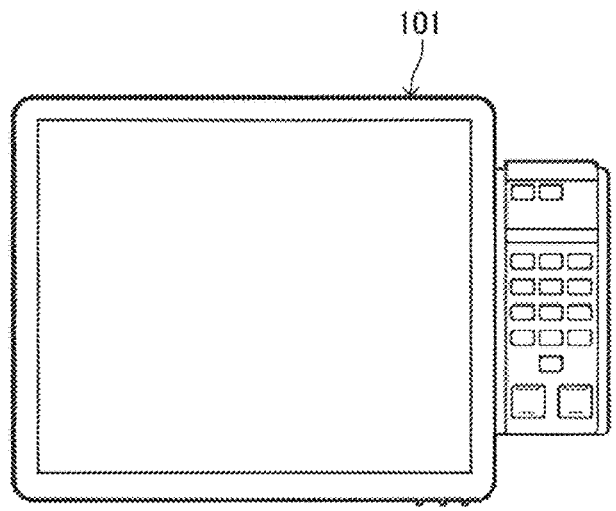
FIG. 8 is a diagram illustrating a control panel.

FIG. 8 is a diagram illustrating a control panel.

Notification in the first embodiment is made with a method in which a message prompting replacement of the front sheet floating restraint 130 or the front sheet floating restraint 130S, for example, on a control panel 101 as a display as illustrated in FIG. 8. More specifically, the control panel 101 displays the number and name of a member indicating the front sheet floating restraint 130 or the front sheet floating restraint 130S after replacement or an appearance image of the front sheet floating restraint 130 or the front sheet floating restraint 130S, so that a user can recognize the front sheet floating restraint 130 or the front sheet floating restraint 130S after the replacement. Note that the method of notifying the replacement is not limited to the above-described method.

Figure 9:
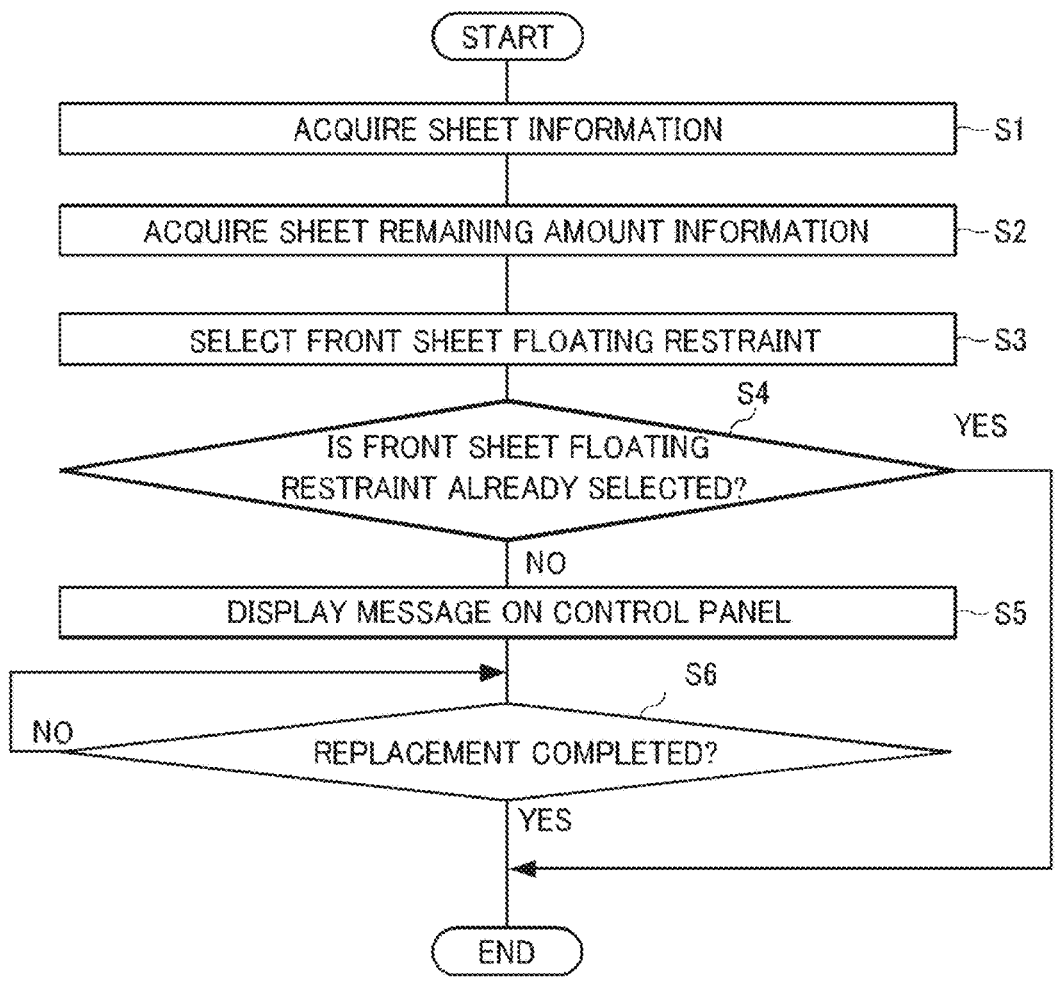
FIG. 9 is a flowchart of a process flow in replacement of the front sheet floating restraint according to the first embodiment.

FIG. 9 is a flowchart of a process flow in replacement of the front sheet floating restraint 130 or the front sheet floating restraint 130S, according to the first embodiment.

In the first embodiment, in order to display a message prompting replacement of a front sheet floating restraint according to the type of sheets S or the remaining amount of sheets S on the control panel 101, a controller that controls the sheet separating device 100 acquires sheet information of sheets stacked on the sheet stacking table 110, as change information (step S1). Then, the controller acquires information of the remaining amount of sheets on the sheet stacking table 110, as sheet remaining amount information (step S2). The controller may be a controller that performs the overall control of an image forming apparatus or may be a controller that performs control of the sheet separating device 100 alone. In the first embodiment, either of the controller for an image forming apparatus or the controller for the sheet separating device 100 is a controller 200 provided in an image forming apparatus 1 illustrated in FIG. 11.

The sheet information to be acquired includes, for example, the basis weight, type (material and structure), thickness, and size of the sheet. Each of the sheet information is acquired, for example, by using the control panel 101 that is a touch panel functioning as an operation receiver, based on information input by a user. Alternatively various sensors, each functioning as a sheet information detector implemented in the sheet separating device 100, may detect and acquire the sheet information. The sheet information thus acquired is stored in a storing device to be used by the controller 200.

The sheet remaining amount information to be acquired may be detected, for example, by a sensor functioning as a sheet remaining amount detector implemented in the sheet separating device 100. Specifically, for example, the height of the sheet stacking table 110 at the leading end of the sheet is detected by the sensor, and the (remaining) amount of the sheets stacked on the sheet stacking table 110 is acquired based on the detection result.

Next, the controller 200 executes processing of selecting a corresponding one of the front sheet floating restraint 130 and the front sheet floating restraint 130S, based on the acquired sheet information and the acquired sheet remaining amount information step S3). The processing of this selection is to obtain, in advance through an experiment or experiments, a correspondence relation of a suitable front sheet floating restraint and each of the sheet information and the sheet remaining amount information. The correspondence relation is stored in the storing device. The corresponding front sheet floating restraint is selected according to the acquired sheet information and the acquired sheet remaining amount information, with reference to the correspondence relation stored in the storing device.

Then, the controller 200 checks whether the front sheet floating restraint currently attached to the upper guide plate 131 is the front sheet floating restraint selected in step S3 (step S4). The method of the above-described checking in first embodiment is to provide detection target portions having different shapes for each front sheet floating restraint and check the shape of the detection target portion by a detector such as an optical sensor based on the detection result. Note that, when the currently attached front sheet floating restraint is the front sheet floating restraint selected in step S3 (YES in step S4), the replacement of the front sheet floating restraint is completed.

On the other hand, when the currently attached front sheet floating restraint is not the front sheet floating restraint selected in step S3 (NO in step S4), the controller 200 causes the control panel 101 to display a message prompting replacement (change) to the selected front sheet floating restraint (step S5). As a result, a user checks the message displayed on the control panel 101 to grasp the front sheet floating restraint suitable for the current sheet or the remaining amount of sheets, so that the user performs replacement to the suitable front sheet floating restraint.

Then, when the user replaces to the suitable front sheet floating restraint following the display on the control panel 101, the detection target portion of the front sheet floating restraint replaced by the user is detected by a detector. The controller 200 checks whether the selected front sheet floating restraint is replaced, based on the detection result (step S6). When the controller 200 confirms that the selected front sheet floating restraint is successfully replaced (YES in step S6), the replacement of the front sheet floating restraint is completed. Note that the confirmation of completion of replacement is not limited to the above-described method, for example, with the detector as in the first embodiment. For example, the completion of replacement may be confirmed by that the user inputs the completion of replacement by touch on the control panel 101.

Note that the weight of the sheet S is a significant parameter that determines a suitable angle α of each of the front sheet floating restraint 130 and the front sheet floating restraint 130S. Due to this configuration, it is preferable to select a suitable front sheet floating restraint between the front sheet floating restraint 130 and the front sheet floating restraint 130S having different angles α from each other, based on the basis weight and size of the sheet S.

Regarding suitable distance L or the suitable angle β of each of the front sheet floating restraint 130 and the front sheet floating restraint 130S, the thickness of the sheet S may also be a significant parameter. For this reason, as the sheet information to be acquired, it is preferable to select a suitable front sheet floating restraint between the front sheet floating restraint 130 and the front sheet floating restraint 130S having different distances L or angles β from each other, based on the thickness of the sheet S.

Generally, even if the different sheets have the same thickness, the coated paper is, for example, 1.3 to 1.5 times heavier than a plain paper. Therefore, a suitable angle α may vary depending on type (material and structure) of the sheet. For this reason, information of type of sheet is useful information in selection between the front sheet floating restraint 130 and the front sheet floating restraint 130S.

In any case, a greater amount of the sheet information is preferably acquired in selection of a suitable one from the front sheet floating restraint 130 and the front sheet floating restraint 130S.

Figure 10:
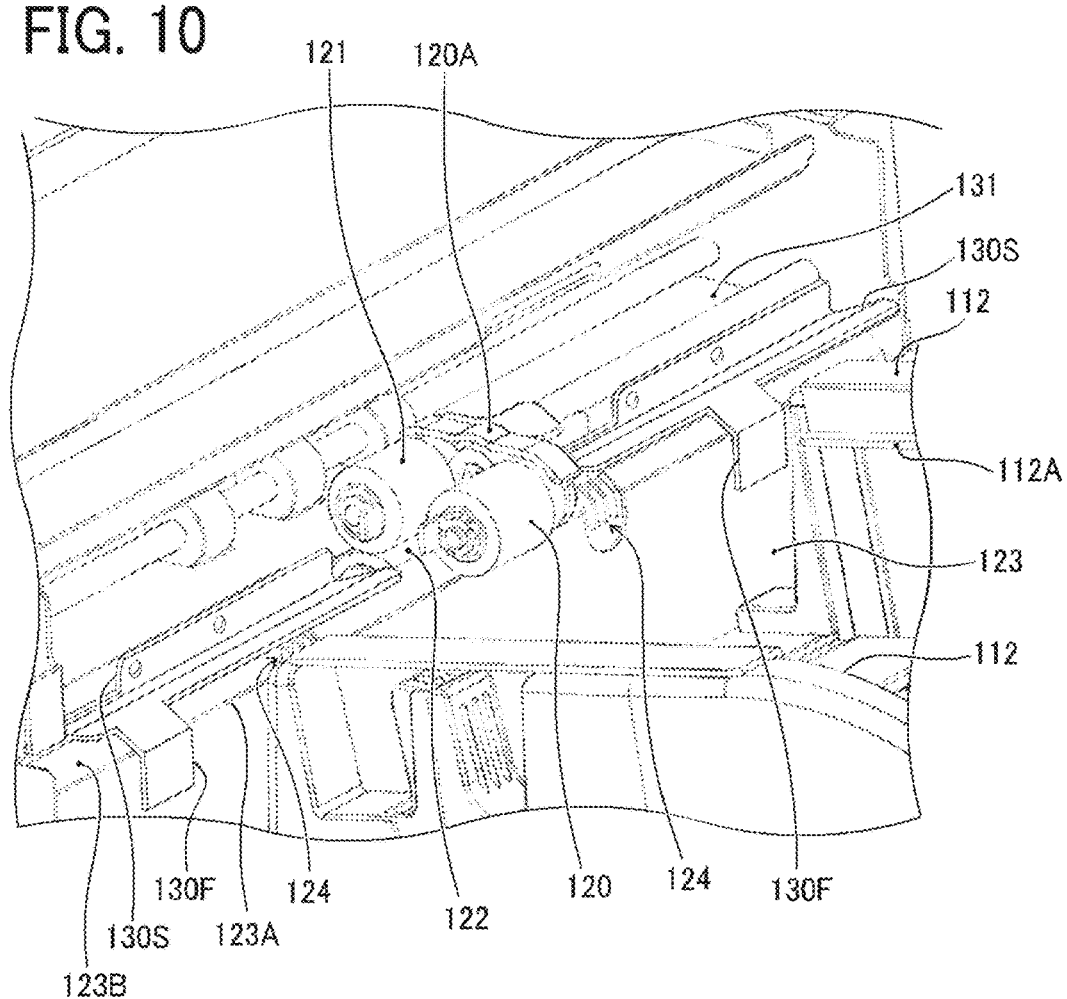
FIG. 10 is a diagram illustrating the front sheet floating restraint as a variation of the embodiment.

FIG. 10 is a diagram illustrating the front sheet floating restraint as a variation of the embodiment.

In the first embodiment, as described above, the pickup roller 120 is interposed between the two pairs of air outlets 124 in the width direction of the sheet separating device 100. In other words, the four air outlets 124 are disposed as illustrated in FIG. 2. Due to this configuration, when the sheet size is relatively small, while air blown from the inner pair of air outlets 124, for example, is blown off to the leading end of the sheet, air blown from the outer pair of air outlets 124 is hardly blown off to the leading end of the sheet. In such a case, the outer pair of air outlets 124 is preferably blocked.

As a result, as in the case in which the sheet size is relatively small, the front sheet floating restraint 130S that is selected when the outer pair of air outlets 124 is not used may include a shield 130F that blocks the outer pair of air outlets 124, as illustrated in FIG. 10. The shield 130F is disposed at a position at which the outer pair of air outlets 124 is blocked when the front sheet floating restraint 130S is attached. In particular, in the configuration of the first embodiment, each of the air outlets 124 receives air supply from the air duct 125 that is shared by the air outlets 124. In this configuration, by blocking a part of the air outlets 124 (e.g., the outer pair of air outlets 124), air blown from the rest of the air outlets 124 (e.g., the inner pair of air outlets 124) is intensified.

Figure 11:
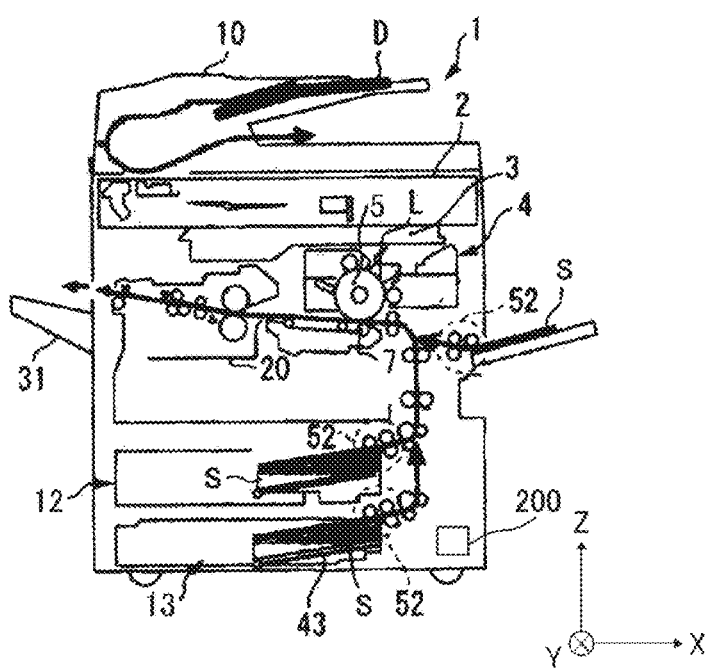
FIG. 11 is a schematic view of an image forming apparatus to which the sheet separating device of FIG. 1 is included.

FIG. 11 is a schematic view of an image forming apparatus to which the sheet separating device of FIG. 1 is applied, according to the first the present disclosure.

An original document D is conveyed (fed) by an original document conveying unit 10 in a direction indicated by arrow in FIG. 1 and passes over a document reading device 2, so that the document reading device 2 optically reads image data of the original document D. An exposure light L such as optical laser light based on the read image data is emitted from an exposure device 3 (in other words, an optical writing device) to irradiate a photoconductor drum 5 of an image forming device 4. After predetermined image forming processes (e.g., a charging process, an exposing process, and a developing process), the image forming device 4 forms an image (i.e., a toner image) corresponding to the image data is formed on the photoconductor drum 5. The image formed on the photoconductor drum 5 is transferred by a transfer device 7 onto a sheet S that has been conveyed from a selected one of the sheet feeding units 12 and 13. After the transfer process, a fixing device 20 fixes the toner image to the sheet S. Then, the sheet S is conveyed and stacked on a sheet ejection tray 31.

As described above, the image forming apparatus 1 includes a plurality of sheet feeding units, which are the sheet feeding units 12 and 13. The sheet feeding units 12 and 13 have substantially identical structures to each other. The sheet feeding unit 13 includes a sheet stacker 43 (that is, an elevation plate) and a sheet feeding mechanism 52. The sheet feeding mechanism 52 that functions as a sheet feeder to feed a sheet S loaded on the sheet stacker 43. The sheet separating device according to the first embodiment may be used as each of the sheet feeding units 12 and 13.

Second Embodiment

Next, a description is given of a sheet separating device according to another embodiment (referred to as a "second embodiment") of the present disclosure, suitable for handling a sheet functioning as a recording medium used as a sheet material particularly in an image forming apparatus.

As a method of providing a front sheet floating restraint having a suitable shape according to a type of sheets on the sheet stacking table 110 or the remaining amount of sheets S on the sheet stacking table 110, the sheet separating device 100 according to the first embodiment replaces (changes) the front sheet floating restraint. In the second embodiment, the shape or posture of the front sheet floating restraint is changed without replacing the front sheet floating restraint 130 attached to the upper guide plate 131. By so doing, the front sheet floating restraint may be a suitable shape according to a type of sheets on the sheet stacking table 110 or the remaining amount of sheets S on the sheet stacking table 110.

Figure 12A:
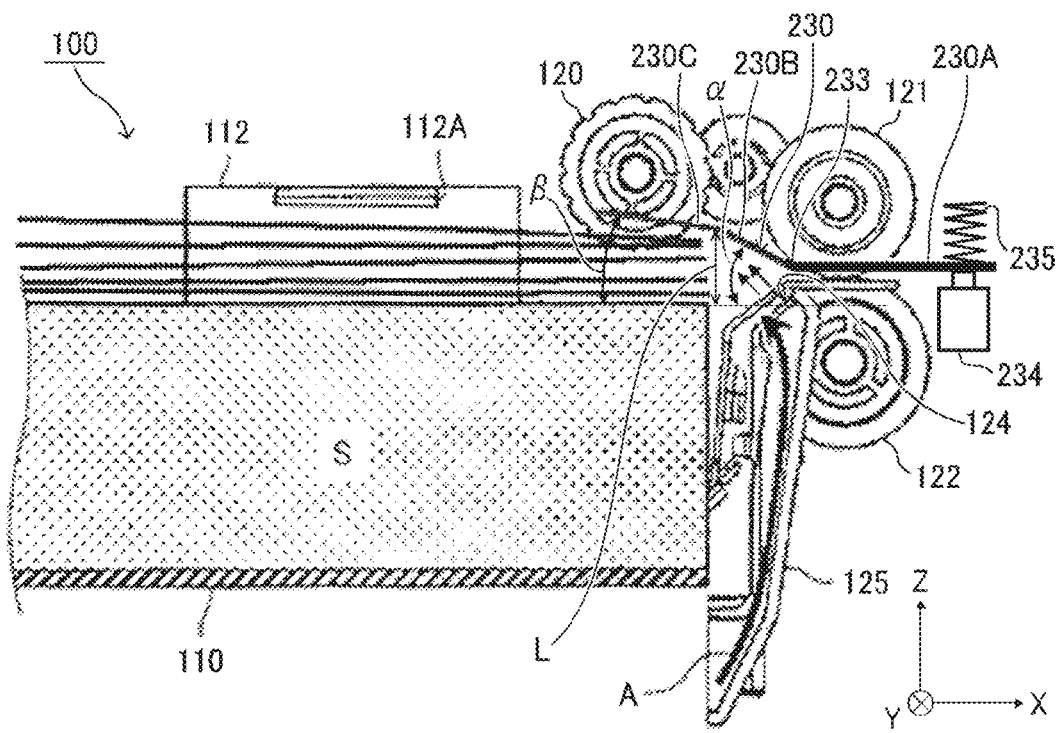
FIGS. 12A and 12B are diagrams, each illustrating a change of the posture of the front sheet floating restraint when various types of sheets are stacked together on the sheet stacking table according to a second embodiment.
Figure 12B:
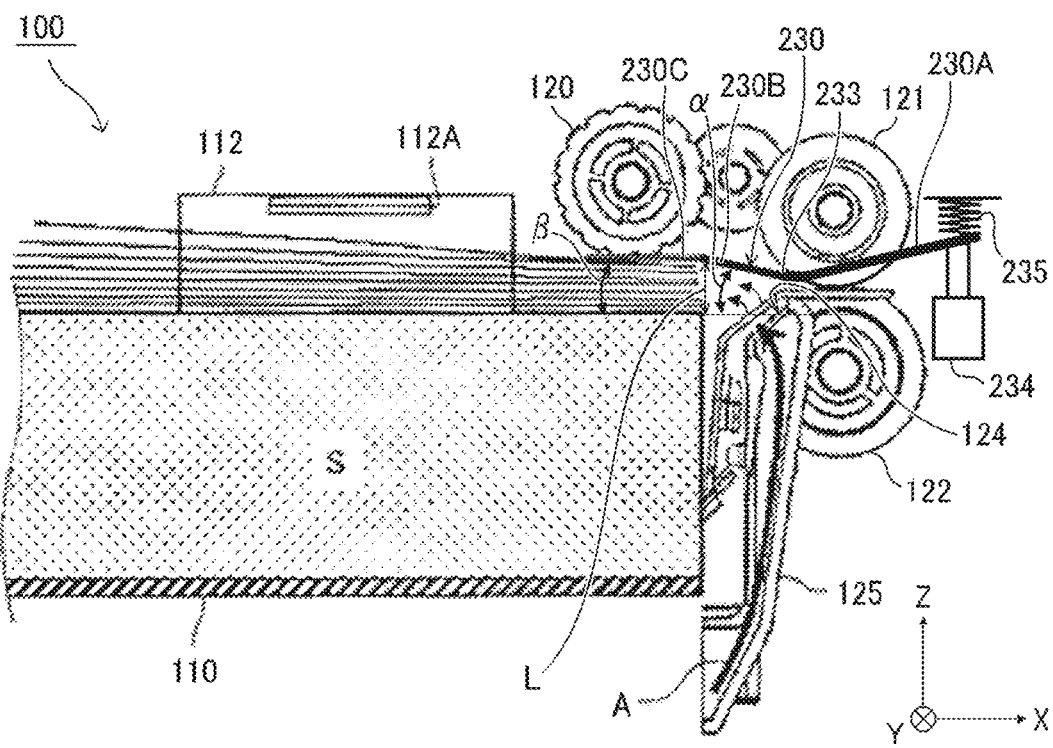

FIGS. 12A and 12B are diagrams, each illustrating a change of the posture of a front sheet floating restraint 230 when various types of sheets are stacked together on the sheet stacking table 110, according to the second embodiment.

The front sheet floating restraint 230 includes a movable portion 230A, a first inclined portion 230B, and a second inclined portion 230C in this order from a downstream side in the sheet conveyance direction and is supported to be rotatable about a boundary portion 233 between the movable portion 230A and the second inclined portion 230C. The movable portion 230A is disposed on the outside of the sheet conveyance passage in the width direction so as not to hinder sheet conveyance. Each of the first inclined portion 230B and the second inclined portion 230C is a sloped portion inclined away from the surface of the plurality of sheets S (sheet bundle) stacked on the sheet stacking table 110, toward upstream in the sheet conveyance direction.

The lower face of the movable portion 230A of the front sheet floating restraint 230 is in contact with a solenoid 234 that functions as an adjuster. The upper face of the movable portion 230A of the front sheet floating restraint 230 is in contact with the spring 235 that functions as a biasing force applier to be biased downward. Due to this configuration, the movable shaft of the solenoid 234 moves in a vertical direction (upward and downward directions), so that the movable portion 230A moves in the vertical direction. The front sheet floating restraint 230 rotates about the boundary portion 233. The posture of the first inclined portion 230B and the posture of the second inclined portion 230C are changed (angle α, angle β, distance L).

In the second embodiment, the controller 200 causes the solenoid 234 to rotate the front sheet floating restraint 230 to obtain the angle α, the angle β, and the distance L, each being preferable according to the sheet information to be acquired or the remaining sheet amount information to be acquired.

As illustrated in FIG. 12A, in a case in which the sheet S is relatively high in mass (percent) per sheet and relatively high rigid (e.g., sheet material such as thick paper and coated paper), it is preferable that the angle α of the first inclined portion 230B is larger. In this case, the controller 200 causes the solenoid 234 to rotate the front sheet floating restraint 230 to lower the movable portion 230A, so as to increase the angle α of the first inclined portion 230B. For example, as illustrated in FIG. 12B, in a case in which the sheet S is relatively low in mass (percent) per sheet and relatively low rigid (e.g., sheet material such as thin paper), it is preferable that the angle α of the first inclined portion 230B is smaller. In this case, the controller 200 causes the solenoid 234 to rotate the front sheet floating restraint 230 to elevate the movable portion 230A, so as to decrease the angle α of the first inclined portion 230B.

In the second embodiment, the controller 200 causes the front sheet floating restraint 230 to rotate to change the posture of the front sheet floating restraint 230, so that the front sheet floating restraint has a suitable shape according to a type of sheets on the sheet stacking table 110 or the remaining amount of sheets S on the sheet stacking table 110. However, the operation to achieve the suitable shape of the front sheet floating restraint is not limited to the above-described operation. For example, the front sheet floating restraint 230 is formed with a flexible elastic member, so that the front sheet floating restraint 230 is bent to deform according to the type of sheets to be acquired or the remaining sheet amount information to be acquired to obtain the preferable angle α, the preferable angle β, and the preferable distance L.

Note that a sheet separating device incorporating an air blower, like the sheet separating device 100 according to the first embodiment, has the following advantages. Generally, a sheet separating device incorporated in an image forming apparatus includes a sheet loader such as a bottom plate. The sheet separating device separates and feeds sheets functioning as recording media stacked on the bottom plate one by one toward an image forming device. However, an example of the sheets to be separated is a coated paper and an art paper are examples of the sheets to be separated. These sheets have good smoothness on the surface and good hygroscopicity due to less breathability. Due to this configuration, adhesion between the sheets tends to increase under the highly humid condition. For this reason, the sheets of coated paper or art paper have difficulties in separation, compared to the sheets of plain paper, resulting in frequent multiple feeding or continuous feeding.

To reduce the adhesion between the sheets, air is blown toward an end portion of the sheets. Specifically, air is blown to an end surface of the sheets under pressure that does not attract the sheets to each other, thereby separating the sheets from each other.

The sheet separating device is also configured to restrict excessive floating of a part of the sheets separated from each other by air blown out from an air outlet. This configuration prevents the sheets from being lifted up or blown off when the sheets float up. Since the air is blown in a direction perpendicular to the end surface of the sheets to efficiently separate the sheets, the separation of the sheets is reliably performed.

The sheet separating device 100 of the first embodiment has some other advantages as below. A typical sheet floating restraint is generally disposed in parallel with a bottom plate or sheets. In addition to the effect of restricting floating of the sheet, the air passes parallel to the sheets when separating the sheets by air effectively separates the sheets from each other. The sheet floating restraint is disposed in parallel with the sheets, a floating sheet contacts the sheet floating restraint, allowing the air to be blown at right angles to an end surface of the sheets.

Occasionally, however, an air blower may not be installed horizontally to the end portion of the sheets to blow air. The air blower disposed at a horizontal position to the end portion of the sheets may enlarges the overall configuration of a sheet separating device, affecting downsizing of the sheet separating device. In order to address such a situation, the air blower may be disposed below the end portion of the sheets (that is, in a direction of blowing up an upper part of the stacked sheets). However, since this configuration does not allow air to contact the end portion of the sheets horizontally; the effect of separating the sheets from each other is likely to be reduced. Rather, in such a configuration, the air blower may lift the upper part of the stacked sheets as a bundle of sheets, possibly raising the risk of multiple feeding.

By contrast, since the sheet separating device of the first embodiment includes the sheet floating restraint having an angle, even when the air outlets 124 are disposed below the end portion of the sheets (that is, in the direction of blowing up the upper part of the stacked sheets), the angle to blow air to the end portion of the sheets is appropriate, and the effect of separating the sheets from each other maximizes the sheet separation effect.

The configurations described above are examples, and aspects of the present disclosure provide respective effects as follows.

First Mode

In the first mode, a sheet separating device (for example, the sheet separating device 100) includes a stacker (for example, the sheet stacking table 110), a pickup member (for example, the pickup roller 120), an air supplier (for example, the air supplier 126 including the fan 125A, the air duct 125, and the air outlets 124), and a sheet floating restraint (for example, the front sheet floating restraint 130). The stacker is configured to stack a plurality of sheets (for example, the sheets S). The pickup member is configured to convey the plurality of sheets one by one from the stacker. The air supplier includes an air outlet (for example, the air outlets 124), at a downstream side of the stacker in a sheet conveyance direction in which a sheet is conveyed from the plurality of sheets on the stacker. The air supplier is configured to blow air toward a downstream end of the plurality of sheets in the sheet conveyance direction. The sheet floating restraint is configured to restrict floating of a part of the plurality of sheets separated by air blown from the air outlet. The sheet floating restraint is replaceable with another sheet floating restraint (for example, the front sheet floating restraint 130S). The sheet floating restraint and said another sheet floating restraint have a shape different from each other.

A sheet floating restraint of a known sheet separating device restricts floating of the plurality of sheets and changes the air blowing direction (to guide the air). By so doing, the known sheet floating restraint obtains the separability and the feeding performance. However, the optimal shape of the sheet floating restraint to stably obtain these effects depends on difference of sheets stacked on the stacker or the remaining amount of the plurality of sheets on the stacker. For this reason, the configuration in which the shape of the sheet floating restraint is not changeable is capable of fully achieving these effects with a certain kind of sheets or the remaining amount of such a certain type of sheets but is not likely to fully achieve these effects with another type of sheets or the remaining amount of another type of sheets.

Since the sheet floating restraint is replaceable in the first mode, the sheet floating restraint of the sheet floating restraint according to the first mode restrains floating of the plurality of sheets and changes the air blowing direction to guide the air sufficiently, under the condition that the sheet separating device according to the first mode has a larger number of types of sheets or a greater remaining amount of sheets than the known sheet separating device. Due to this configuration, the sheet separating device according to the first mode obtains the separability and the feeding performance reliably.

Second Mode

In the second mode according to the first mode, the sheet separating device (for example, the sheet separating device 100) further includes a notification unit (for example, the control panel 101) configured to make a notification to prompt a user to change the sheet floating restraint based on a predetermined change information.

According to this configuration, a user replaces the sheet floating restraint (for example, the front sheet floating restraint 130) with an optimal sheet floating restraint (for example, the front sheet floating restraint 130S), following the notification without making an error in the selection.

Third Mode

In the first mode, a sheet separating device (for example, the sheet separating device 100) includes a stacker (for example, the sheet stacking table 110), a pickup member (for example, the pickup roller 120), an air supplier (for example, the air supplier 126 including the fan 125A, the air duct 125, and the air outlets 124), a sheet floating restraint (for example, the front sheet floating restraint 230), and an adjuster (for example, the solenoid 234). The stacker is configured to stack a plurality of sheets (for example, the sheets S). The pickup member is configured to convey the plurality of sheets one by one from the stacker. The air supplier includes an air outlet (for example, the air outlets 124), at a downstream side of the stacker in a sheet conveyance direction in which a sheet is conveyed from the plurality of sheets on the stacker. The air supplier is configured to blow air toward a downstream end of the plurality of sheets in the sheet conveyance direction. The sheet floating restraint is configured to restrain floating of a part of the plurality of sheets separated from each other by air blown from the air outlet. The adjuster is configured to change a shape or a posture of the sheet floating restraint, based on change information.

In the sheet separating device according to the third mode, the shape of the sheet floating restraint is changed with an optimal shape, without changing (replacing) the sheet floating restraint, in accordance with the difference of sheets stacked on the stacker or the remaining amount of the plurality of sheets on the stacker. According to this configuration, the sheet floating restraint of the sheet floating restraint according to the third mode restrains floating of the plurality of sheets and changes the air blowing direction to guide the air sufficiently, under the condition that the sheet separating device according to the first mode has a larger number of types of sheets or a greater remaining amount of sheets than the known sheet separating device, without forcing a user to change (replace) the sheet floating restraint. Due to this configuration, the sheet separating device according to the third mode obtains the separability and the feeding performance reliably.

Fourth Mode

In the fourth mode according to the second mode or the third mode, the change information (for example, sheet information) includes sheet information of the plurality of sheets stacked on the stacker.

According to this configuration, the shape of the sheet floating restraint (for example, the front sheet floating restraint 130) is changed in accordance with the difference of the plurality of sheets stacked on the stacker.

Fifth Mode

In the fifth mode according to the fourth mode, the sheet floating restraint (for example, the front sheet floating restraint 130) has a sloped face (for example, the first inclined portion 130B and the second inclined portion 130C) inclined away from the surface of the sheet (for example, the sheets S) stacked on the stacker (for example the sheet stacking table 110), toward upstream in the sheet conveyance direction. The sheet floating restraint (for example, the front sheet floating restraint 130S) after being changed has a larger inclination angle (for example, the angle α60 and the angle β) of the sloped face to the surface of the sheet, as the sheet indicated by the sheet information is thicker or heavier.

As the thickness or weight of the sheet increases, the force in the upward direction acting on the sheet by air increases to float the sheet. Then, as the angle of inclination of the sloped face of the sheet floating restraint with respect to the surface of the sheet increases, the air blowing direction directs further upwardly, and the force in the upward direction acting on the sheet S to which the air is blown increases. Due to this configuration, even if the sheet is relatively thick or relatively heavy, the sheet is stably floated.

Further, as the sheet is thinner or lighter, the sheet separating device according to the present mode the angle of inclination of the sloped face of the sheet floating restraint with respect to the surface of the sheet is decreased. When the force in the upward direction acting on the sheet by air is too large, such a sheet is likely to excessively float, resulting in a paper jam. As the angle of inclination of the sloped face of the sheet floating restraint with respect to the surface of the sheet decreases, the upward component in the air blowing direction decreases, and the force in the upward direction acting on the sheet S to which the air is blown decreases. Due to this configuration, even if the sheet is relatively thin or relatively light, the sheet is stably floated without causing a paper jam.

Sixth Mode

In the sixth mode according to the fourth mode or the fifth mode, the air supplier (for example, the air supplier 126) includes a plurality of air outlets including the air outlet (for example, the air outlets 124), in a width direction of the plurality of sheets. The sheet floating restraint (for example, the front sheet floating restraint 130) includes a shield (for example, shield 130F) configured to block a part of the plurality of air outlets in a case in which the sheet indicated by the sheet information has a predetermined small size in the width direction of the sheet.

According to this configuration, blocking a part of the plurality of air outlets that is not unused restrains a defect caused by the unused part of the plurality of air outlets.

Seventh Mode

In the seventh mode according to any one of the second mode to the sixth mode, the predetermined change information includes remaining sheet amount information of the plurality of sheets (for example, the sheets S) stacked on the stacker (for example, the sheet stacking table 110).

According to this configuration, the shape of the sheet floating restraint (for example, the front sheet floating restraint 130) is changed in accordance with the remaining amount of the plurality of sheets stacked on the stacker.

Eighth Mode

In the eighth mode according to any one of the first mode or the seventh mode, the sheet floating restraint (for example, the front sheet floating restraint 130) is configured to guide air blown from the air outlet (for example, the air outlets 124), toward downstream in the sheet conveyance direction.

According to this configuration, in a case in which the air outlet is set such that air blown from the air outlet directs downward below the end of the sheet (i.e., direction in which the upper part of the sheets on the stacker is blown up), the air blowing direction is changed by the sheet floating restraint to blow air at a preferable angle.

Ninth Mode

An image forming apparatus according to the ninth mode includes the sheet separating device (for example, the sheet separating device 100) according to any one of the first mode to the eighth mode.

According to this configuration, the image forming apparatus obtains the separability and the feeding performance of the sheets stably.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet separating device comprising:
a stacker configured to stack a plurality of sheets;
a pickup member configured to convey the plurality of sheets one by one from the stacker;
an air supplier including an air outlet, at a downstream side of the stacker in a sheet conveyance direction in which a sheet is conveyed from the plurality of sheets on the stacker, the air supplier being configured to blow air toward a downstream end of the plurality of sheets in the sheet conveyance direction;
a sheet floating restraint configured to restrict floating of a part of the plurality of sheets separated by air blown from the air outlet, the sheet floating restraint being replaceable with another sheet floating restraint, the sheet floating restraint and said another sheet floating restraint having respective shapes different from each other; and
a control panel including a display configured to provide a visual notification requesting a user change the sheet floating restraint to the said another sheet floating restraint in response to a determination, based on change information, that the another sheet floating restraint provides superior restriction of the floating of the part of the plurality of sheets.

2. The sheet separating device according to claim 1, wherein the change information includes sheet information of the plurality of sheets stacked on the stacker.

3. The sheet separating device according to claim 2, wherein the sheet floating restraint has a sloped face inclined away from a surface of the sheet stacked on the stacker, toward upstream in the sheet conveyance direction, and
wherein the sheet floating restraint after being changed has a larger inclination angle of the sloped face to the surface of the sheet, as the sheet indicated by the sheet information is thicker or heavier.

4. The sheet separating device according to claim 3,
wherein the air supplier includes a plurality of air outlets including the air outlet, in a width direction of the plurality of sheets, and
wherein the sheet floating restraint includes a shield configured to block a part of the plurality of air outlets in a case in which the sheet indicated by the sheet information has a predetermined small size in the width direction of the sheet.

5. The sheet separating device according to claim 1,
wherein the change information includes remaining sheet amount information of the plurality of sheets stacked on the stacker.

6. The sheet separating device according to claim 1,
wherein the sheet floating restraint is configured to guide air blown from the air outlet, toward downstream in the sheet conveyance direction.

7. An image forming apparatus comprising:
the sheet separating device according to claim 1; and
an image forming device configured to form an image on the sheet separated by the sheet separating device.

8. The sheet separating device according to claim 1, further comprising:
a controller configured to,
determine, based on the change information, whether the another sheet floating restraint provides superior restriction of the floating of the part of the plurality of sheets as compared to the sheet floating restraint currently installed in the sheet separating device, and
instruct the control panel to provide the visual notification requesting the user change the sheet floating restraint to the said another sheet floating in response to determining that the another sheet floating restraint providing superior restriction of the floating of the part of the plurality of sheets.

9. A sheet separating device comprising:
a stacker configured to stack a plurality of sheets;
a pickup member configured to convey the plurality of sheets one by one from the stacker;
an air supplier including an air outlet, at a downstream side of the stacker in a sheet conveyance direction in which a sheet is conveyed from the plurality of sheets on the stacker,
the air supplier being configured to blow air toward a downstream end of the plurality of sheets in the sheet conveyance direction;
a sheet floating restraint configured to restrict floating of a part of the plurality of sheets separated by air blown from the air outlet; and an adjuster configured to electrically reposition the sheet floating restraint to change a shape or a posture of the sheet floating restraint, based on change information.

10. The sheet separating device according to claim 9,
wherein the change information includes sheet information of the plurality of sheets stacked on the stacker.

11. The sheet separating device according to claim 10,
wherein the sheet floating restraint has a sloped face inclined away from a surface of the sheet stacked on the stacker, toward upstream in the sheet conveyance direction, and
wherein the sheet floating restraint after being changed has a larger inclination angle of the sloped face to the surface of the sheet, as the sheet indicated by the sheet information is thicker or heavier.

12. The sheet separating device according to claim 10,
wherein the air supplier includes a plurality of air outlets including the air outlet, in a width direction of the plurality of sheets, and
wherein the sheet floating restraint includes a shield configured to block a part of the plurality of air outlets in a case in which the sheet indicated by the sheet information has a predetermined small size in the width direction of the sheet.

13. The sheet separating device according to claim 9,
wherein the change information includes remaining sheet amount information of the plurality of sheets stacked on the stacker.

14. The sheet separating device according to claim 9,
wherein the sheet floating restraint is configured to guide air blown from the air outlet, toward downstream in the sheet conveyance direction.

15. An image forming apparatus comprising:
the sheet separating device according to claim 9; and
an image forming device configured to form an image on the sheet separated by the sheet separating device.

16. The sheet separating device according to claim 9, further comprising:
a controller configured to,
determine whether to electrically reposition the sheet floating restraint based on the change information indicating that repositioning of the sheet floating restraint would provide superior restriction of the floating of the part of the plurality of sheets as compared to a current position of the sheet floating restraint, and
instruct a solenoid to move to electronically reposition the sheet floating restraint in response to determining to reposition the sheet floating restraint.

* * * * *